United States Patent Office 2,890,920
Patented June 16, 1959

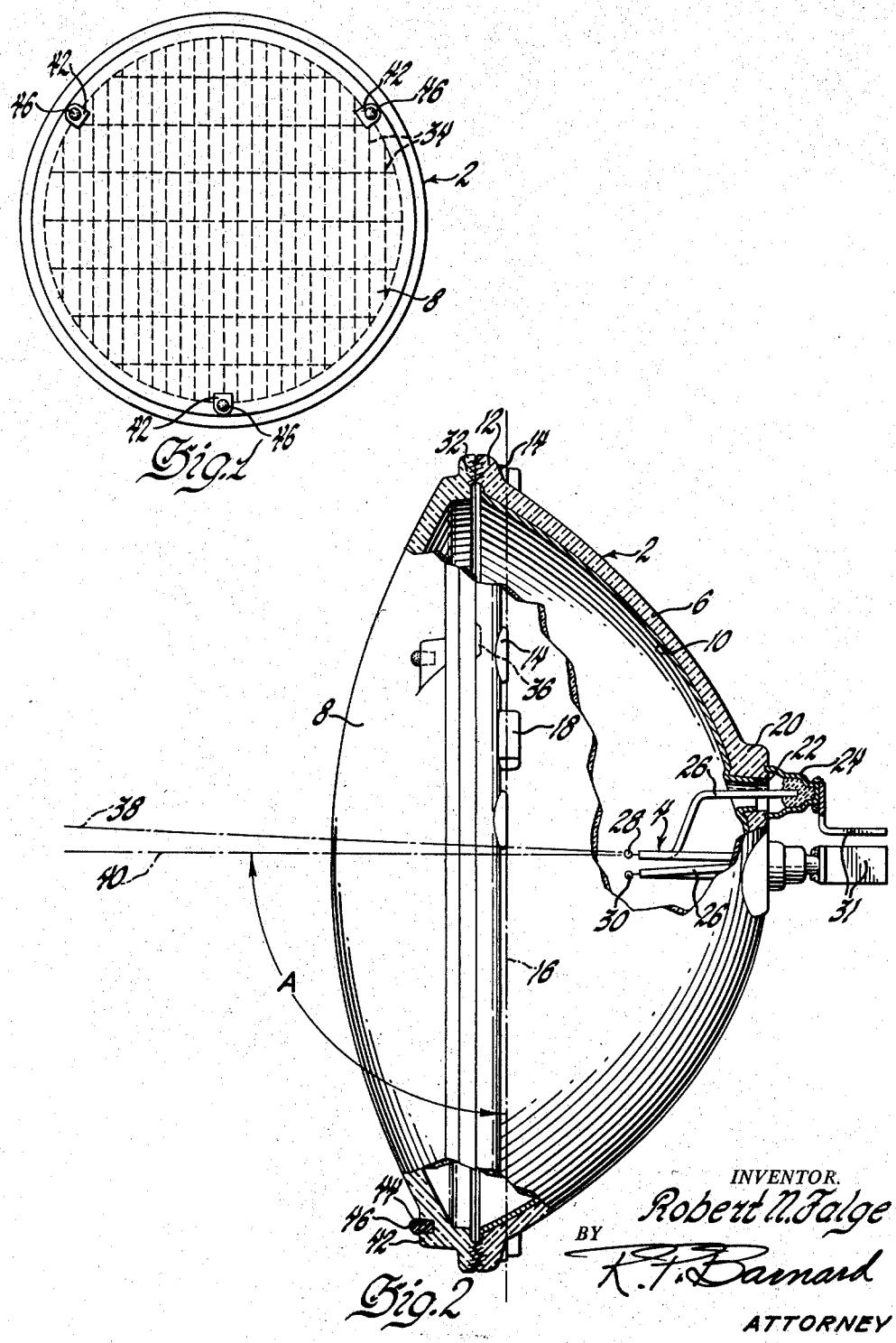

2,890,920

HEADLAMP PRE-AIMING APPARATUS

Robert N. Falge, Anderson, Ind., assignor to General Motors Corporation, Detroit, Mich., a corporation of Delaware Application July 12, 1957, Serial No. 671,518

10 Claims. (Cl. 316—23)

This invention relates to projection lamps of the type which are provided with an aiming plane having a known disposition with respect to the direction of the light beam projected from the lamp, and to a method and apparatus for manufacturing such lamps.

Perhaps the greatest advantage of pre-aimed projection lamps is that they may be aimed geometrically upon installation for use with precision previously obtained only by optical aiming. In general, this is accomplished by providing on the lamp structure an aiming plane having a known relation to the actual direction of the light beam projected from the lamp. The desirability of pre-aimed projection lamps, especially vehicle headlamps, becomes more apparent from consideration of presently known lamp production techniques and desired lamp performance.

In the manufacture of projection lamps, such as vehicle headlamps, optical imperfections occur in successive lamps manufactured by the same apparatus and technique. This optical imperfection is manifested by lack of uniform relationship of the light beam direction and a selected geometrical axis of the lamp structure. Such relationship for each lamp is unknown and varies randomly because of insufficient precision in the relative positioning and characteristics of the parts of the optical system. Although there has been much effort to improve the manufacturing technique to insure the required precision, this effort has not yielded a commercially successful optically perfect lamp. Consequently, the aiming of projection lamps, particularly vehicle headlamps, with great accuracy has continued an important problem in the development of improved vehicle lighting.

The numerous approaches in the prior art to the problem of aiming vehicle headlamps may be characterized generally as either optical aiming or geometrical aiming. In optical aiming, the lamp is mounted on the vehicle and illuminated; the light beam is directed upon a simple remotely located aiming screen or a more complex optical equivalent, and the beam pattern is adjusted by directional adjustment of the lamp. Optical aiming of this type has proved to be disadvantageous because it requires elaborate equipment; however, it is quite accurate. In geometrical aiming, the lamp is mounted on the vehicle and a selected axis of the lamp structure is directionally adjusted with reference to one or more axes of the vehicle. Geometrical aiming is highly advantageous in that the aiming apparatus required is simple and inexpensive. Moreover, the aiming may be performed quickly and without the necessity of a large space. Until the development of the pre-aimed projection lamp, geometrical aiming was inaccurate because the relation between the projected light beam direction and the selected axis of the lamp structure was unknown. In the pre-aimed lamp, however, this relationship is incorporated with a known value into the lamp structure. Thus, geometrical aiming may be accomplished with the precision of optical aiming.

Generally speaking, apparatus of the type herein contemplated for the manufacture of the aforementioned pre-aimed projection lamps normally include a plurality of machines or, alternatively, operating stations in fewer or a single machine for performing different operations upon the lamp elements. Insofar as it is necessary for an understanding of this invention, it may be noted that such machines may typically comprise a rotary index turret having a plurality of lamp supports spaced thereon for sequential indexing to various operating stations. At one or more of these stations, the lamp reflector and the lens placed thereon are subjected to heat to raise their mating peripheral edges to a high temperature thereby softening them. Thereafter, while the mating surfaces are in a somewhat pliable state, the interior of the lamp is wholly or partially evacuated to draw the mating peripheral edges of the reflector and lens together to form a seal. Then, in order to relieve any strain in the seal and while the lens is still in a somewhat pliable state, a gas under pressure is supplied to the interior of the lamp to cause the lens to "stretch" thereby relieving these strains. Such an apparatus and method are in common use by the major manufacturers of vehicle headlamps at this time.

After the lamp has been sealed, it is then necessary to establish the aforementioned aiming plane which has a known and predetermined angularity with respect to the direction of the light beam projected therefrom. In the copending application of Raymond A. Gaither et al., entitled "Headlamp Pre-Aiming Apparatus," S.N. 531,886, filed September 1, 1955 and assigned to the assignee of this invention, there is disclosed an apparatus and method for forming an aiming plane on the sealed lamp structure. Generally speaking, the apparatus disclosed by this copending application includes a rotary index turret adapted to receive on suitable supports a plurality of the sealed lamp units for sequential indexing to various operating stations. Included among these stations is an optical aiming apparatus for aiming or locating the light beam, a gauging apparatus which engages a plurality of surface portions of the lens adjacent its periphery to determine the minimum amount of grinding necessary thereon to define the aiming plane, and an apparatus to grind these portions of the lamp to secure the aiming plane. In this regard, the grinding operation adds materially to the cost of the finished lamp and, as a matter of fact, is a source of some difficulty in that the portions of the glass being ground to provide the aiming plane often chip or break, resulting in rejects.

Therefore, it is an object and feature of this invention to provide a pre-aimed projection lamp having means formed thereon without grinding to define a geometrical aiming plane.

More particularly, it is an object and feature of this invention to provide a periphery of the lamp lens with a plurality of spaced plugs of suitable material, the tips of the plugs defining the aiming plane.

According to another feature of this invention, it is intended to provide an improvement in apparatus for manufacturing projection lamps at a high rate of production, great precision, and with a minimum of rejects.

More particularly, it is an object of this invention to provide a lamp manufacturing apparatus and method which will eliminate any necessity for a grinding operation on the lamp lens in forming the aforedescribed aiming plane.

In general, these and other objects, features and advantages of the invention are obtained by providing a support for an already sealed lamp structure which may be sequentially indexed to a plurality of operating stations. These stations include suitable apparatus for aiming or locating the position of the projected light beam, a station for probing a plurality of surface portions of the lamp lens to determine the variance in the height of these portions from a height which will define the aiming plane, an aim correction apparatus which will function to deposit a material or plug of material on the lamp surface portions to build up these portions of the lamp to define the aiming plane, and a seating apparatus which includes means for firmly securing the material or plug on the lamp structure.

A more complete understanding of the invention will result from the detailed description below when taken in view of the acccompanying drawings in which:

Figure 1 is a front elevation of a lamp manufactured by the apparatus and method of this invention;

Figure 2 is an enlarged side elevation, partly broken away, of the lamp of Figure 1;

Figure 3:
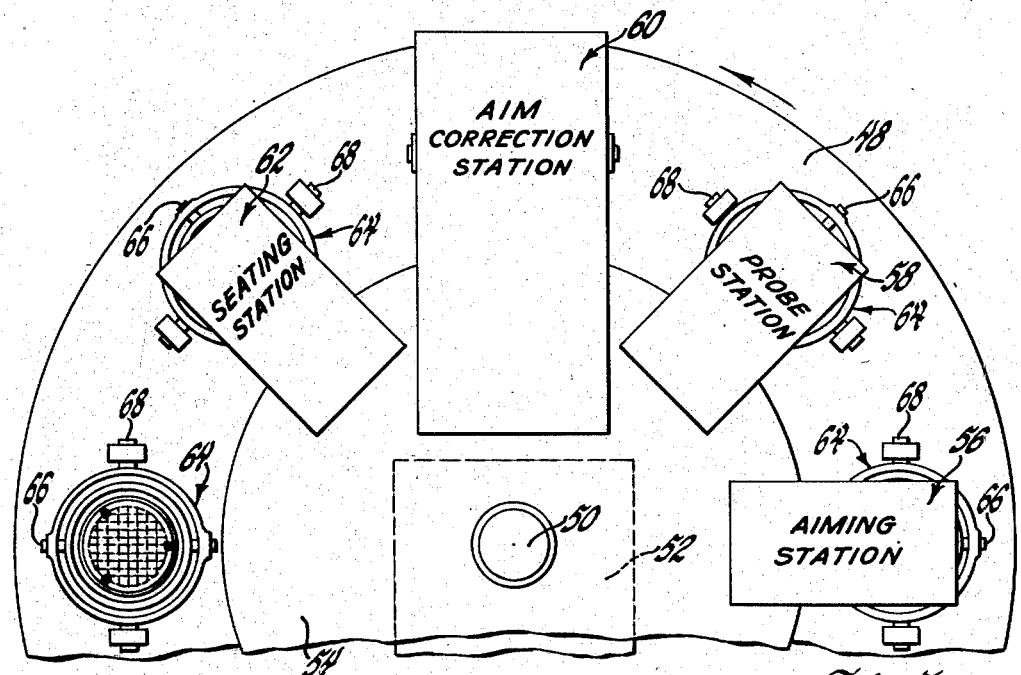
Figure 3 is a schematic plan view of the apparatus for manufacturing the lamp.

Referring now to the drawing, and particularly Figures 1 and 2, there is shown an illustrative embodiment of the projection lamp especially suitable for manufacture by the apparatus and method of this invention. This projection lamp is of the all glass sealed beam vehicle type, although it will be understood that the invention is applicable to lamps of different types and for different uses.

The projection lamp 2 comprises, in general, a light source 4 enclosed by a reflector 6 for imparting directional control to the light rays emanating from the light source, and an integrally joined lens or cover of glass 8 which may impart distributional control of the light rays controlled by the reflector. The reflector is provided with a reflective inner surface or coating 10, preferably a bright metallic deposit. The reflector may be constructed of glass, and is suitably molded to provide a configuration having the desired optical properties. For example, the inner surface may be a surface of revolution of paraboloidal curvature or a combination of such surfaces. The reflector terminates in an annular flange 12 which is provided with a plurality of spaced seating surfaces 14 which define a mounting plane 16, and a plurality of orienting lugs 18 for engagement with an associated mounting surface such as the mounting ring or ball member of the well known ball-and-socket headlamp installation (not shown). The reflector is provided with integrally formed spaced bosses 20 which define passageways 22 extending through the reflector. The reflector supports the light source 4 by means of ferrules 24 disposed over the passages through the reflector. The metal ferrules support lead wires 26 suitably secured as by brazing to the former. The light source 4 takes the form of upper beam filament 28 and lower beam filament 30 suitably connected to the lead wires 26. The ferrules are adapted for connection with an associated energizing circuit (not shown) by respective terminals 31 which are suitably affixed to the ferrules.

The lens or cover 8 of molded glass is provided with an annular flange or rim 32 which is integrally joined by fusion in a sealing apparatus to the annular flange 12 of the reflector. The interior surface of the lens 8 may be provided with fluting and light controlling prisms indicated schematically at 34 in a manner well understood by those skilled in the art. The lens 8 is oriented with respect to the reflector body 6 by a suitable orienting key or projection 36 on the annular flange 32. The lamp 2 comprising the integrally combined reflector 6, lens 8, and light source 4 is preferably filled with an inert gas to a pressure slightly more than atmospheric pressure and the lamp is hermetically sealed for use.

An ideal lamp, or one which directs selected light rays in a known direction relative to a selected geometrical axis of the lamp structure, is not achieved in commercial production because of lack of precise relative positioning of the parts of the optical system and inaccuracies in individual parts of the system. Thus, a typical optically imperfect lamp may have an actual optical axis 38 of a selected portion of the projected light rays which is not coincident with the intended or desired optical axis 40 having a known angular displacement A from a geometrical reference on the lamp structure such as the mounting plane 16 defined by the surface of seating lugs 14. The effect of the optical imperfections, whatever the cause, has been to preclude precise aiming of the projected light by simple geometrical aiming instruments.

Therefore, a plurality of molded glass bosses or surface portions 42 project from spaced points about the periphery of the lens 8 and have formed therein the recesses 44. Plugs 46 of plastic or other suitable material are seated within these recesses, the forward extremities or tips of the plugs defining the aforedescribed aiming plane having a known angular disposition with respect to the actual beam axis 40 of the lamp.

Figure 4:
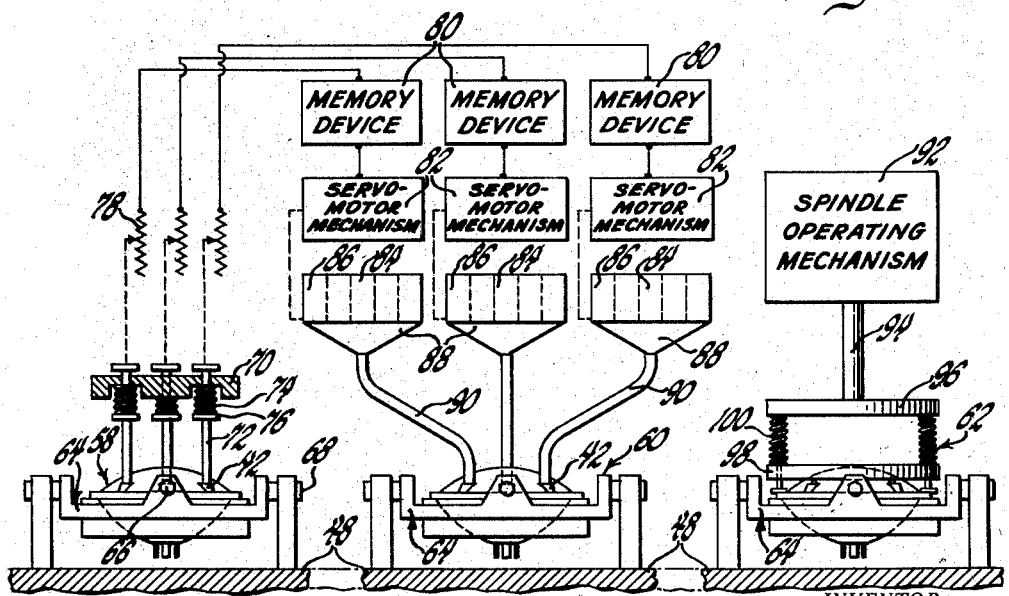
Figure 4 is another view of the operating stations of Figure 3 which cooperate to manufacture the lamp of Figures 1 and 2.

An apparatus is disclosed in Figures 3 and 4 for determining the sizes of the respective plugs 46 to define the aforementioned aiming plane. In describing this apparatus and method, and in the interest of clarity, various parts of the system are represented in the drawings in a somewhat diagrammatical manner. To emphasize the features of and to avoid obscuring the invention with detail, conventional components necessary to an operative system are represented schematically or symbolically. For example, the electrical devices and mechanical connections associated with this apparatus are represented schematically or symbolically inasmuch as they are commercially available or well known in the art.

Referring now more specifically to Figures 3 and 4, there is disclosed an apparatus which includes a rotary index turret 48 mounted upon a supporting shaft 50 and adapted to be driven sequentially to various operating stations by the indexing drive mechanism 52. A fixed table or support member 54 is positioned adjacent and usually above the rotary turret 48 for supporting the aiming station 56, probe station 58, aim correction station 60 and the seating station 62, each of which includes suitable apparatus for the manufacture of the lamp as will appear more fully hereinafter.

A plurality of lamp supports 64 are positioned on the rotary turret 48 and comprise a gimbal structure including inner and outer rings respectively pivotally mounted on the shafts 66 and 68, a suitable surface of the lamp, such as the surface defining the mounting plane 16, being seated upon the inner gimbal ring. Thus, a plurality of lamps are seated in the supports 64 and are sequentially indexed to the respective operating stations as will be described more fully hereinafter.

As aforementioned, the lamp structure is formed by a sealing operation which is generally well known and used in the art. Such a sealing operation may take place at a sealing station prior to the location of the aiming station 56. Moreover, the construction and arrangement of the aiming station is not indicated other than schematically inasmuch as it is well known and may take the form of the apparatus shown in the aforementioned copending Gaither et al. application. Suffice it to say for the purpose of this disclosure, such an apparatus may include a fixed aiming screen and various optical elements as desired positioned opposite the lamp 2 and upon which a light beam may be projected by placing the terminals 31 in an electrical circuit. Thereafter, through suitable control mechanism disclosed in the aforementioned application, the pivot shafts 66 and 68 may be rotated as required to bring the actual light beam to a fixed and located point on the screen at which time the support 64 for the lamp is locked in position. Thereafter, the lamp support and the lamp are indexed to the probe station.

The probe station 58 includes a support 70 through which a plurality of probes 72 are reciprocably disposed for contact with the bosses 42 surrounding the recesses 44. Springs or other suitable resilient means 74 surround the respective probes 72 and abut shoulders 76 formed thereon and the support 70 to permit resisted reciprocation of the probes relative to the support. For the purpose of a better understanding of the function of this apparatus, let it be assumed that the support 70 is parallel to the aforementioned aiming screen. Thus, in operating the gimbal lamp support structure 64 to aim and locate the projected light beam, the plane defined by the surface of the inner gimbal ring on which the lamp mounting plane 16 rests may be and ordinarily is canted out of parallelism with the aiming screen and therefore with the support member 70. Thus, when the support member is lowered opposite or over the lamp, the respective probes 72 will be reciprocated axially possibly to varying extents depending upon the relative heights of the bosses 42.

Each of the probes 72 are connected by circuitry to a controlling mechanism for the aim correction station. Each of these circuits may include a potentiometer 78 to supply a voltage signal to each of the memory devices 80 which in turn control the operation of a servo-motor mechanism 82 for a purpose which will appear more fully hereinafter.

The aim correction station 60 includes a plurality of bins 84, herein shown to be three in number thereby corresponding with the number of bosses formed on the lamp lens, and include any desirable number of compartments 86 which are connected through a funnel 88 and guide means such as a tube 90 to a point overlying the recesses 44 in the bosses. Each compartment of each bin contains different sized plugs which may be selectively discharged through the guiding means 90 to the recesses 44. Discharge of the plugs from the respective compartments may be controlled by a movable floor or closure member which separates the compartments from the funnel 88 and guiding means. Operation of these closure members is then controlled by the servo-motor mechanisms 82 which are operatively connected to the memory devices 80.

The seating station 62 includes a suitable operating mechanism 92 for vertically reciprocating the shaft or spindle 94 to dispose the support plate or ring 96 over or opposite the lamp in which the plugs have been deposited at the aim correction station. A plurality of rods are fixedly secured to the support member 96 and support thereon for relative movement with respect to the support member a seating member or ring 98 adapted to abuttingly engage the tips of the plugs 46 seated in the boss recesses. A spring 100 surrounds each of the rods and abuts the seating member 98 and support member 96 to resist relative movement therebetween and impose a force on the seating member urging it against the tips of the plugs.

In operation, a lamp structure 2 is placed in the lamp support 64 and is subjected to the sealing and aiming operations aforedescribed. As aforementioned, the sealing and aiming apparatus may be incorporated as stations in the particular apparatus shown in Figure 3 or may constitute an additional machine or machines. In any event, a sealed lamp structure in which the actual light beam axis or direction has been located usually by optical means is sequentially indexed to the probe station 58. At this station, the support member 70 is disposed opposite to the lamp 2 so that the respective probes 72 are moved axially possibly to varying degrees thereby actuating the potentiometers 78 to supply a signal voltage to the memory devices 80 which will control the servo-mechanisms 82 at the aim correction station 60.

Thereafter, the turret 48 is indexed to the aim correction station. At this station, the guiding means 90 are disposed over the recesses 44 formed on the lamp lens adjacent its periphery. The respective servo-motor mechanisms are actuated in response to the signal stored in the memory devices to discharge a particular size plug from the proper compartment 86 of each of the bins 84, which plug will be directed to the recess 44 on the lamp. Thus, the probes 72 measure the variance in the heights of the boss surfaces from respective heights which will define an aiming plane having a known angular disposition with respect to the light beam axis, it being true that the recesses of the bosses are of equal depth. Naturally, the probes could be used directly upon the base of the recesses 44 which would insure the accuracy of this operation. To further illustrate this portion of the operation, let it again be assumed that probe support member 70 is parallel to the fixed screen of the aiming station. In the aiming station, the lamp support structure 64 will be operated until such time as the beam of light strikes the proper locating portion of the fixed screen. Since the probe support 70 is parallel or otherwise disposed in a reference position relative to this screen, it may be said that the probes will sense a height desired for each of the bosses which would define a plane parallel to the support 70 and thereby the screen of the aim station.

Thereafter, the lamp and lamp support is indexed to the seating station 62 at which time the seating member 98 is brought into abutting engagement with the tips of the plugs to firmly seat them in the recesses. In this regard, it may be desirable to coat the recesses with an adhesive or other material to insure that the plugs will be firmly engaged therein. Such a coating may be supplied at any point in the process just described prior to the deposition of the plugs within the recesses.

Having shown and described an illustrative form of a lamp and an apparatus and method for manufacturing it, it is to be understood that other forms will be apparent to those skilled in the art and, accordingly, the invention is not to be limited by the embodiment shown but only by the scope of the claims which follow.

I claim:

1. In the manufacture of sealed lamps of the type including a reflector and lens sealed thereto and a light source enclosed within said lens and reflector, a method for forming an aiming plane on said lamp having a known disposition relative to the axis of the light beam projected from said source, said method comprising optically aiming said lamp to locate the light beam thereof, probing a plurality of surface portions on said lamp to sense the variance in height of these portions from heights which will define said aiming plane, and depositing a material on at least one of these portions to define said plane.

2. In the manufacture of sealed lamps of the type including a reflector and lens sealed thereto adjacent its periphery and a light source enclosed within said lens and reflector, a method for forming an aiming plane on said lamp having a known disposition relative to the axis of the light beam projected from said source, said method comprising optically aiming said lamp to locate the light beam thereof, probing a plurality of surface points on said aimed lamps to sense the variance in height of these points from heights which will define said aiming plane, and securing plugs on said points to define said plane.

3. In the manufacture of sealed lamps of the type including a reflector and lens sealed thereto adjacent its periphery and a light source enclosed within said lens and reflector, a method for forming an aiming plane on said lamp having a known disposition relative to the axis of the light beam projected from said source, said method comprising optically aiming said lamp to locate the light beam thereof, probing a plurality of surface portions on said lamp to sense the variance in height of these portions from heights which will define said aiming plane, depositing a material on at least one of these portions to define said plane, and bringing a seating member into engagement with said material to firmly seat the latter on said surface portions.

4. In the manufacture of lamps of the type including integrally sealed reflector and lens elements enclosing a light source and having a plurality of recesses spaced about said lens adjacent its periphery, a method for forming an aiming plane on said lamp having a known disposition relative to the axis of the light beam projected from said source, said method comprising optically aiming said lamp to locate the light beam thereof, probing a plurality of surface portions on said lens adjacent said recesses to determine points above the base of said recesses which will define said aiming plane, and depositing material in said recesses to define said aiming plane.

5. In the manufacture of lamps of the type including integrally sealed reflector and lens elements enclosing a light source and having a plurality of recesses spaced about said lens adjacent its periphery, a method for forming an aiming plane on said lamp having a known disposition relative to the axis of the light beam projected from said source, said method comprising optically aiming said lamp to locate the light beam thereof, probing a plurality of surface portions on said lens adjacent said recesses to determine points above the base of said recesses which will define said aiming plane, and depositing plugs in said recesses which are each of a height which will define said aiming plane.

6. In the manufacture of lamps of the type including integrally sealed reflector and lens elements enclosing a light source and having a plurality of recesses spaced about said lens adjacent its periphery, a method for forming an aiming plane on said lamp having a known disposition relative to the axis of the light beam projected from said source, said method comprising optically aiming said lamp to locate the light beam thereof, probing a plurality of surface points on said lens adjacent said recesses to determine points above the base of said recesses which will define said aiming plane, depositing plugs in said recesses which are each of a height which will define said aiming plane, and bringing a seating member into abutting engagement with said plugs to firmly seat the latter in said recesses.

7. An apparatus for use in the manufacture of projection lamps of the type comprising a lens and reflector sealed adjacent their peripheries and enclosing a light source, and a plurality of surface portions spaced about the periphery of said lens for defining an aiming plane having a known disposition relative to the axis of the light beam projected from said source; said apparatus comprising a support for said lamp which may be moved to various operating stations; an aiming station opposite said support for aiming the beam of said lamp; a probe station including a plurality of probes engageable with said lens surface portions, control circuits energizable by said probes to provide signals indicating points above each of said lens surface portions which will define said aiming plane; an aim correction station comprising means for selectively depositing a material of suitable height on said lens surface portions to establish said plane, said means including mechanism responsive to the respective signals from said probes for depositing said material.

8. An apparatus for use in the manufacture of projection lamps of the type comprising a lens and reflector sealed adjacent their peripheries and enclosing a light source, and a plurality of recesses spaced about the periphery of said lens for receiving plugs defining an aiming plane having a known disposition relative to the axis of the light beam projected from said source; said apparatus comprising a support for said lamp which may be sequentially indexed to various operating stations; an aiming station opposite said support for aiming the beam of said lamp; a probe station including a plurality of probes engageable with surface portions of said lens adjacent said recesses, control circuits energizable by said probes to provide signals indicating points above the base of each of said recesses which will define said aiming plane; an aim correction station comprising a plurality of compartments associated with each recess, aim correction plugs of varying sizes contained in the respective compartments, means including motor mechanism responsive to the respective signals from said probes for discharging a plug from selected compartments, and means connected to said compartments for guiding said discharged plugs into said recesses.

9. An apparatus for use in the manufacture of projection lamps of the type comprising a lens and reflector sealed adjacent their peripheries and enclosing a light source, and a plurality of recesses spaced about the periphery of said lens for receiving plugs defining an aiming plane having a known disposition relative to the axis of the light beam projected from said source; said apparatus comprising a support for said lamp which may be sequentially indexed to various operating stations; an aiming station opposite said support for aiming the beam of said lamp; a probe station including a plurality of probes engageable with surface portions of said lens adjacent said recesses, control circuits energizable by said probes to provide signals indicating points above the base of each of said recesses which will define said aiming plane; an aim correction station comprising an individual bin for each of said lens recesses, a plurality of compartments in each of said bins, aim correction plugs of varying sizes contained in the respective compartments of each bin, means including motor mechanism responsive to the respective signals from said probes for discharging a selected size plug from said bins, and means connected to said bins for guiding said discharged plugs into said recesses.

10. An apparatus for use in the manufacture of projection lamps of the type comprising a lens and reflector sealed adjacent their peripheries and enclosing a light source, and a plurality of recesses spaced about the periphery of said lens for receiving plugs defining an aiming plane having a known disposition relative to the axis of the light beam projected from said source; said apparatus comprising a support for said lamp for indexing the latter to various operating stations; an aiming station including means for aiming the beam of said lamp; a probe station including a plurality of probes engageable with surface portions of said lens adjacent said recesses, control circuits energizable by said probes to provide signals indicating the variance in height of each of said lens surface portions from heights which will define said aiming plane; an aim correction station comprising an individual bin for each of said lens surface portions, a plurality of compartments in each of said bins, aim correction plugs of varying sizes contained in the respective compartments of each bin, means including motor mechanism responsive to the respective signals from said probes for discharging a selected size plug from said bins, means connected to said bins for guiding said plugs into said recesses; a seating station including a seating member, and means for moving said seating member into abutting engagement with said plugs whereby the latter are firmly seated in said recesses.

References Cited in the file of this patent

UNITED STATES PATENTS

| | | |
|---|---|---|
| 1,329,640 | Snavely | Feb. 3, 1920 |
| 2,459,532 | Ickis | Jan. 18, 1949 |
| 2,633,548 | Kramel | Mar. 31, 1953 |
| 2,689,924 | Honing et al. | Sept. 21, 1954 |

UNITED STATES PATENT OFFICE
CERTIFICATE OF CORRECTION

Patent No. 2,890,920 June 16, 1959

Robert N. Falge

It is hereby certified that error appears in the printed specification of the above numbered patent requiring correction and that the said Letters Patent should read as corrected below.

Column 1, line 45, for "continued" read -- constituted --.

Signed and sealed this 15th day of December 1959.

(SEAL)
Attest:

KARL H. AXLINE
Attesting Officer

ROBERT C. WATSON
Commissioner of Patents